3,780,039
4-β-HYDROXYETHYL-as-TRIAZINES

Donald L. Trepanier, Midland, Mich., assignor to The Dow Chemical Company, Midland, Mich.
No Drawing. Filed June 26, 1972, Ser. No. 266,301
Int. Cl. C07d 55/10
U.S. Cl. 260—248 AS                10 Claims

ABSTRACT OF THE DISCLOSURE

Substituted 4-(β-hydroxyphenethyl)-1,4,5,6-tetrahydro-as-triazines are prepared by the reaction of a trialkylorthoformate with a substituted 2-(β-hydroxyphenethylamino)alkylhydrazine such as 1-[2-(β-hydroxyphenethylamino)ethyl]-1-methylhydrazine. The novel triazine compounds have pharmacological activity as antidepressants as indicated by their antagonism of reserpine and their potentiation of amphetamine.

BACKGROUND OF THE INVENTION

The present invention is concerned with substituted 4 - β - hydroxyethyl - 1,4,5,6-tetrahydro-as-triazine compounds, which can also be named as substituted 5,6-dihydro-as-triazine-4(1H)-ethanols. A number of as-triazines having a variety of substituents are known. For example, see U.S. Pats. 3,428,635; 3,463,777; 3,471,485; 3,471,486; 3,471,487; 3,471,488; and 3,497,509.

SUMMARY OF THE INVENTION

This invention is concerned with novel asymmetrical triazines substituted in the 4 position with a β-hydroxyphenethyl substituent, and is particularly directed to substituted as-triazine compounds and their pharmacologically-acceptable salts, the substituted 1,4,5,6-tetrahydro-as-triazines corresponding to the formula

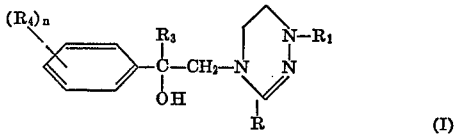

(I)

In the present specification and claims, R, $R_1$, $R_2$ and $R_3$ each independently represent hydrogen, methyl, ethyl or propyl, and $R_4$ represents methyl, ethyl, chloro, bromo or fluoro, and $n$ represents one of the integers 0, 1 or 2. For the sake of convenience and brevity, the compounds corresponding to Formula I above will be hereinafter referred to as "triazines." The novel triazines are crystalline solids which are of varying degrees of solubility in organic solvents such as acetone, ether, alcohols, benzene and chloroform. The term "pharmacologically-acceptable salt" as herein employed refers to salts of the triazine compounds which are substantially non-toxic at dosage rates consistent with good pharmacological activity. Such salts include no-toxic acid addition salts with inorganic acids such as hydrochloric, hydrobromic, sulfuric or phosphoric acid, or with organic acids such as acetic, succinic, malic, maleic, tartaric or citric acid, or with organic sulfonic acids such as methanesulfonic or p-toluenesulfonic acid.

Preferred triazines include those in which the substituent $R_4$ is in the 3- or 4-position on the phenyl ring when $n$ is 1 or 2, and those wherein $R_2$ and $R_3$ are hydrogen. Also preferred are those compounds wherein $n$ is zero and $R_2$ and $R_3$ represent hydrogen.

The triazine compounds of the invention have pharmacological activity on the central nervous system, and can be used in the study of drug effects on the central nervous system, and in studies of learning ability and meory. In pharmacological evaluation procedures the triazine compounds have been found to potentiate barbiturates, antagonize reserpine or to potentiate amphetamine, for example. Compounds wherein $n$ is zero or one have also been found to enhance learning rates in animals.

PREPARATION OF THE COMPOUNDS

The triazines of the invention are prepared by the reaction of a trialkylorthoester, such as trimethyl or triethyl orthoformate, orthoacetate, or orthopropionate corresponding to the formula R—C(O—alkyl)$_3$, with a 2-(β-hydroxyphenethylamino)alkylhydrazine corresponding to the formula

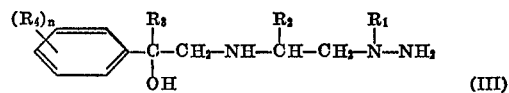

(III)

wherein R, $R_1$, $R_2$, $R_3$ and $R_4$ have the significance set out above with respect to Formula I. The reaction proceeds when the reactants are contacted and mixed at a temperature of about 85° C. or higher. The reaction can be conveniently carried out in an inert organic liquid such as benzene, toluene or xylene as a reaction medium, although the reaction can be carried out without a separate inert liquid reaction medium.

The reaction proceeds readily at a temperature of from about 85 to about 190° C. In a convenient procedure, the reaction is carried out at the boiling temperature of the reaction mixture at or about normal atmospheric pressure and under reflux. The reaction proceeds readily with production of the desired product and alkanol of reaction when the reactants are contacted at the reaction temperature over a wide range of proportions; however, the hydrazine and orthoester reactants are preferably employed in proportions from substantially equimolar to about a 50 percent molar excess of orthoester. The triazine product is conveniently separated by conventional procedures such as evaporation or cooling and filtration, etc. The product can be purified by known techniques such as recrystallization and washing.

The pharmacologically-acceptable salts of the triazines are conveniently prepared according to conventional techniques such as by dissolving the free base compound in a solvent such as methanol, ethanol or ether and thereafter adding an excess of a pharmaceutically-acceptable acid such as hydrochloric, hydrobromic, sulfuric, malic, maleic or citric acid or the like until precipitation of the product is complete. The product can be separated by conventional procedures. The free base triazines can be prepared from the salts by mixing the salt or a solution of the salt in a minimal amount of methanol with an excess of an aqueous base such as sodium hydroxide or sodium carbonate, according to conventional procedures.

In preparing the triazines of the present invention, the 2 - (β-hydroxyphenethylamino)alkylhydrazine and orthoester are contacted intimately in any order or fashion. The temperature of the reaction mixture is maintained at a temperature within the desired reaction temperature range for a period of time of from about 4 to 60 hours to complete the reaction. When benzene is employed as a reaction medium, it may be desirable either to employ only minor amounts of benzene, or to carry out the reaction under pressure in order to maintain the reaction temperature above 85° C. Xylene is a preferred liquid reaction medium due to its higher boiling point. After heating the reaction mixture for a sufficient time, the mixture is cooled, evaporated under reduced pressure or otherwise separated to obtain the solid product. In most cases the product precipitates in the reaction mixture on cooling, and can be separated by filtration. The product can be purified by conventional procedures such as recrystallization and washing, or converted to a pharmaceutically-acceptable salt.

PREPARATION OF STARTING MATERIALS

The substituted hydrazine starting materials can be prepared according to the following reaction scheme:

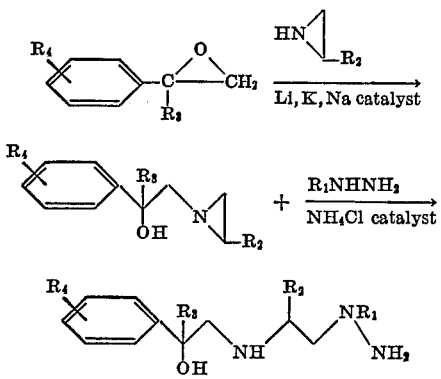

wherein $R_1$, $R_2$, $R_3$ and $R_4$ have the significance set out above.

According to the above scheme the starting materials are prepared by the initial reaction of an epoxide (such as styrene oxide) with an excess of an aziridine (such as ethylene imine) in the presence of an alkali metal catalyst. In a representative procedure, 0.21 gram of lithium is dissolved in 430 grams (10 moles) of ethylene imine, and to this stirred solution is added dropwise 156 grams (1.3 moles) of styrene oxide. The mixture is heated at reflux for 16 hours. The resulting N-($\beta$-hydroxyphenethyl)ethylene imine is separated by distillation. It is then reacted with hydrazine or an alkyl hydrazine to prepare a hydrazine starting material in accordance with known techniques, Trepanier et al., Journal of Medicinal Chemistry, 10, 228 (1967). In such procedures, the hydrazine or alkylhydrazine is reacted with the substituted alkylene imine in the presence of a catalytic amount of ammonium chloride. The reaction mixture is heated at the boiling temperature and under reflux for about 2–24 hours. Thereafter, the excess hydrazine reactant can be distilled off and the product separated by fractional distillation.

DESCRIPTION OF THE PREFERRED EMBODIMENTS

The following examples are merely illustrative of the invention:

Example 1

1-[2-($\beta$-hydroxyphenethylamino)ethyl] - 1 - methylhydrazine (50 grams; 0.24 mole) is mixed with triethylorthoformate (50 grams; 0.34 mole). The resulting mixture is heated at the boiling temperature and under reflux for about 16 hours. The reaction mixture is evaporated under reduced pressure and the free base product is obtained as a white crystalline solid.

The 4-($\beta$-hydroxyphenyl) - 1 - methyl-1,4,5,6-tetrahydro-as-triazine product is recrystallized from a 1:1 mixture of isopropanol and diethylether, then from isopropanol and found to melt at 143°–145° C. The product is found by analysis to have carbon, hydrogen and nitrogen contents of 65.5, 8.0 and 19.1 percent, respectively, as compared with the theoretical contents of 65.7, 7.8 and 19.2 percent, respectively, calculated for the named structure. The structure of the product is confirmed by infrared spectroscopy and by nuclear magnetic resonance spectroscopy.

In substantially the same procedure as described above, the following triazines can be prepared.

4-($\beta$-hydroxyphenethyl) - 5 - methyl-1,4,5,6-tetrahydro-as-triazine hydrochloride having a molecular weight of 2555 is prepared by reacting together triethyl orthoformate and 1 - [2 - ($\beta$-hydroxyphenethylamino)propyl]hydrazine, and reacting the free base product with hydrogen chloride in ether.

1 - ethyl - 4 - ($\beta$-hydroxypyhenethyl)-5-propyl-1,4,5,6-tetrahydro-as-triazine having a molecular weight of 271, is prepared by reacting together trimethyl orthoformate and 1-[2-($\beta$-hydroxyphenethylamino)pentyl] - 1 - ethylhydrazine.

3-ethyl - 4 - $\beta$ - hydroxyphenethyl)-1-methyl-1,4,5,6-tetrahydro-as-triazine, melting at 108°–109° C. is prepared by reacting together triethyl orthopropionate and 1-[2 - ($\beta$-hydroxyphenethylamino)ethyl]-1-methylhydrazine.

3,5-dimethyl - 4 - ($\beta$-hydroxyphenethyl)-1,4,5,6-tetrahydro-as-triazine melting at 121°–122° C. after recrystallization from ethanol ether is prepared by reacting together triethyl orthoacetate and 1-[2-($\beta$-hydroxyphenethylamino)-ethyl-1-methylhydrazine.

Example 2

1-[2-($\beta$-hydroxy - 3,4 - dichlorophenethylamino)-ethyl] hydrazine (10 grams; 0.037 mole) is mixed with triethylorthoformate (10 grams; 0.068 mole) and 50 milliliters of benzene. The resulting mixture is heated at the boiling temperature and under reflux for about 48 hours after which about 40–45 milliliters of the benzene are removed in a Dean Stark apparatus. The reaction mixture is then heated at reflux for about 4 hours and held at ambient temperature overnight. The product crystallizes in the reaction mixture at room temperature and is separated by filtration.

The 4 - ($\beta$ - hydroxy-3,4-dichlorophenethyl)-1,4,5,6-tetrahydro - as - triazine product is recrystallized from isopropanol and then from methanol and found to melt at 138°–140° C. The product is found by analysis to have carbon, hydrogen and nitrogen contents of 47.9, 5.0 and 15.1 percent, respectively, as compared with the theoretical contents of 48.2, 4.8 and 15.3 percent, respectively, calculated for the named structure.

Example 3

1 - [2 - ($\beta$ - hydroxy - 3,4-dichlorophenethylamino) ethyl]hydrazine (10 grams; 0.037 mole) is mixed with triethylorthoacetate (8 grams) and about 35 milliliters of xylene. The resulting mixture is heated at the boiling temperature and under reflux for about 16 hours. The reaction mixture is evaporated under reduced pressure and the 4 - ($\beta$ - hydroxy - 3,4-dichlorophenethyl)-3-methyl - 1,4,5,6 - tetrahydro-as-triazine product is obtained as a crystalline solid.

The product is recrystallized from methanol and washed with diethyl ether, and found to melt at 183°–184° C. The structure of the product is confirmed by infrared spectroscopy and by elemental analysis.

In substantially the same procedure as described above, and in the foregoing examples, the following triazines can be prepared.

4 - ($\beta$ - hydroxy - 4-methylphenethyl)-1-methyl-1,4,5,6-tetrahydro-as-triazine, melting at 167°–169° C. after recrystallization from methanol-ether.

3 - ethyl - 4-($\beta$-hydroxy-4-methylphenethyl)-1-methyl-1,4,5,6-tetrahydro-as-triazine, melting at 83°–84° C. after recrystallziation from methanol-ether, is prepared by reacting together triethyl orthopropionate and 1-[2-($\beta$-hydroxy - 4 - methylphenethylamino)ethyl] - 1 - methylhydrazine.

1,3 - dimethyl - 4 - (β-hydroxyphenethyl)-1,4,5,6-tetrahydro-as-triazine, melting at 115°–117° C., is prepared by reacting together triethyl orthoacetate and 1-[2-(β-hydroxyphenethylamino)ethyl]-1-methylhydrazine.

Example 4

1 - [2 - (β - hydroxy-4-fluorophenethylamino)ethyl]-1-methylhydrazine (10 grams; 0.04 mole) is mixed with triethylorthoformate (8 grams) and about 40 milliliters of xylene. The resulting mixture is heated at the boiling temperature and under reflux for about 60 hours. The reaction mixture is evaporated under reduced pressure and the product is obtained as a white crystalline solid. The 4 - (β - hydroxy - 4 - fluorophenethyl)-1,4,5,6-tetrahydro-1-methyl-as-triazine product is recrystallized twice from a mixture of ethanol and diethyl ether, then from isopropanol and found to melt at 125°–126° C. The structure of the product is confirmed by infrared spectroscopy, by nuclear magnetic resonance spectroscopy, and by elemental analysis.

In substantially the same procedure as described above, the following triazines can be prepared.

1,5 - dimethyl - 3 - ethyl - 4 - (β-hydroxy-β,4-dimethylphenethyl) - 1,4,5,6 - tetrahydro-as-triazine, is prepared by reacting together triethyl orthopropionate and 1-[2-(β - hydroxy - β,4 - dimethylphenethylamino)propyl]-1-methylhydrazine.

4 - (3 - bromo - β - hydroxy - β - methylphenethyl)-1,4,5,6 - tetrahydro - 1,3,5-trimethyl-as-triazine, is prepared by reacting together triethyl orthoacetate and 1-[2-(4 - bromo - β - hydroxy - β - methylphenethylamino) propyl] - 1 - methylhydrazine.

4 - (β - hydroxyphenethyl) - 1,4,5,6 - tetrahydro-as-triazine, melting at 147°–149° C.

4 - (β - hydroxy - 3,4 - dichlorophenethyl) - 1 - methyl-1,4,5,6-tetrahydro-as-triazine, melting at 143°–145° C.

1,3 - dimethyl - 4 - (β - hydroxy-3,4-dichlorophenethyl) - 1,4,5,6-tetrahydro-as-triazine, melting at 134°–136° C.

3 - ethyl - 4 - (β - hydroxy - 3,4 - dichlorophenethyl)-1-methyl-1,4,5,6-tetrahydro-as-triazine, melting at 140°–141° C.

3 - ethyl - 4 - (β - hydroxyphenethyl) - 1,4,5,6-tetrahydro-as-triazine, melting at 141°–143.° C.

3 - ethyl - 4 - (β - hydroxy-3,4-dichlorophenethyl)-1,4,5,6-tetrahydro-as-triazine, melting at 149°–150° C.

4-(β-hydroxy - 4 - fluorophenethyl - 1,3 - dimethyl-1,4,5,6 - tetrahydro - as - triazine, melting at 128°–129° C. is prepared by reacting together triethyl orthoacetate and 1 - [2 - (β - hydroxy - 4 - fluorophenethylamino) ethyl] - 1 - methylhydrazine.

The triazine compounds of the invention have pharmacological activity on the central nervous system. They can be administered to animals by conventional routes, such as oral, subcutaneous, intraperitoneal, intramuscular, etc. In such use they can be formulated with known excipients for administration in the form of capsules, elixirs, parenteral solutions, tablets, powders or the like. The compounds vary somewhat among themselves with respect to pharmacological effects, or combination of effects produced at given dosage rates or routes of administration as illustrated below.

In illustrative operations, the triazine compounds 4-(β-hydroxyphenethyl) - 1 - methyl - 1,4,5,6 - tetrahydro-as-triazine;

4 - (β - hydroxy - 3,4 - dichlorophenethyl) - 1 - methyl-1,4,5,6-tetrahydro-as-triazine;

4 - (β - hydroxy - 3,4 - dichlorophenethyl)-1,4,5,6-tetrahydro-as-triazine; and

3 - ethyl - 4-(β-hydroxy-3,4-dichlorophenethyl)-1,4,5,6-tetrahydro-as-triazine are administered to separate groups of mice at various dosage rates between about 1 and about 100 milligrams of test compound per kilogram of animal body weight and the animals are tested in standard pharmacological testing procedures. These compounds are found to prevent the symptoms of ptosis, piloerection and decreased activity and response to stimuli resulting from the intraperitoneal administration of 5 milligrams of reserpine per kilogram (mg./kg.) to mice. The compounds are found to antagonize reserpine in such operations at an $ED_{50}$ of 36, 10, 5.3, and 32 milligrams per kilogram, respectively, by intraperitoneal injection. In other operations, the 4-(β-hydroxyphenethyl)-1-methyl-1,4,5,6-tetrahydro-as-triazine has also been found to potentiate the central nervous system stimulant effects of the intraperitoneal administration of 5 mg./kg. of amphetamine sulfate to mice. Significant potentiation is observed at an $ED_{50}$ of 14 mg./kg. by intraperitoneal injection. This triazine compound has also been found to have an acute 50 percent lethal dose ($LD_{50}$) in mice of 562 mg./kg. by intraperitoneal injection.

In other operations, 4-(β-hydroxyphenethyl)-1-methyl-1,4,5,6-tetrahydro-as-triazine is mixed with a commercial rodent chow in varying amounts. The mixtures are fed to separate groups of mice daily for five days, corresponding to daily oral dosage rates ranging from 20 to 2500 mg./kg./day. The mice are then given five daily training sessions in a standard "Skinner-box" shock-avoidance apparatus, and their behavior is noted to determine acquisition of shock avoidance behavior. In such operations mice fed the test compound at dosage rates of 157, 313, 625, 1250 and 2500 mg./kg./day are found to acquire a significantly high level of avoidance behavior as compared to mice not administered a test compound, and the test compound is rated active at such dosage levels. Mice receiving 39 mg./kg./day or less perform similarly to untreated mice. 4-(β-hydroxy-4-fluorophenethyl)-1-methyl-1,4,5,6-tetrahydro-as-triazine is also found to have similar activity in similar operations.

In other operations, 4-(β-hydroxyphenethyl)-1-methyl-1,4,5,6-tetrahydro-as-triazine is fed to mice in an amount approximately equivalent to about 313 mg./kg./day for five days prior to testing for shock-avoidance in a Y-maze avoidance apparatus. (In such test an audible tone precedes administration of a 1 milliampere shock to the floor of two arms of the maze. The mouse can avoid or escape the shock by running to the correct arm of the maze, the right or left arm being used for different mice.) Testing and feeding of test compound are continued for five successive days. Statistical comparison of the mean difference in avoidances between the test group of mice and untreated control mice, and of the mean number of avoidances (correct choices) per mouse per day indicated that a significantly higher learning rate is observed in the mice administered the test compound.

What is claimed is:

1. A compound selected from the group consisting of substituted as-triazines and pharmacologically-acceptable salts thereof, the substituted as-triazines corresponding to the formula

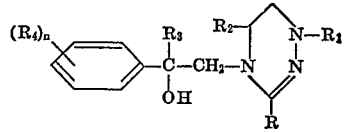

wherein R, $R_1$, $R_2$ and $R_3$ each independently represent hydrogen, methyl, ethyl or propyl; $R_4$ represents hydrogen, methyl, ethyl, chloro, bromo or fluoro; and $n$ represents one of the integers zero, one or two.

2. A compound of claim 1 wherein R, $R_2$ and $R_3$ are hydrogen.

3. A compound of claim 2 wherein $n$ is zero.

4. A compound of claim 3 wherein the compound is 4 - (β - hydroxyphenethyl)-1-methyl-1,4,5,6-tetrahydro-as-triazine.

5. A compound of claim 1 wherein $n$ is two, $R_4$ is chloro, and $R_2$ and $R_3$ are hydrogen.

6. A compound of claim 5 wherein R is hydrogen.

7. A compound of claim 6 wherein the compound is 4 - (β-hydroxy-3,4-dichlorophenethyl)-1,4,5,6-tetrahydro-as-triazine.

8. A compound of claim 6 wherein the compound is 3 - ethyl - 4 - (β-hydroxy-3,4-dichlorophenethyl)-1,4,5,6-tetrahydro-as-triazine.

9. A compound of claim 1 wherein $n$ is 1, R and $R_3$ are hydrogen, and $R_4$ is fluoro.

10. A compound of claim 9 wherein the compound is 4 - (β-hydroxy-4-fluorophenethyl)-1-methyl-1,4,5,6-tetrahydro-as-triazine.

References Cited

UNITED STATES PATENTS 3,463,777    8/1969    Trepanier _____ 260—248

JOHN M. FORD, Primary Examiner

U.S. Cl. X.R.

424—249; 260—239 E, 569

PO-1050
(5/69)

UNITED STATES PATENT OFFICE
CERTIFICATE OF CORRECTION

Patent No. 3,780,039   Dated   December 18, 1973

Inventor(s)   Donald L. Trepanier

It is certified that error appears in the above-identified patent and that said Letters Patent are hereby corrected as shown below:

Column 1, line 40, Formula I, the formula should read as follows:

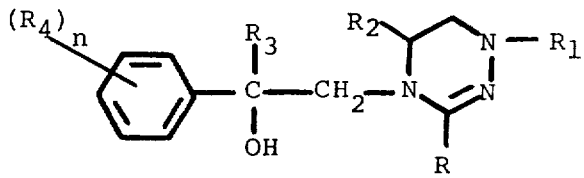

Column 2, line 5, "meory" should read --memory--;

Column 3, line 69, "hydroxyphenyl" should read --hydroxyphenethyl--;

Column 4, line 9, "2555" should read --255.5--;

Column 4, line 18, insert an opening parenthesis before "β";

Column 4, line 27, insert a closing bracket "]" after "ethyl";

Column 4, line 72, "recrystallziation" should read --recrystallizatio

Column 5, line 48, insert a closing parenthesis after "fluorophenethyl";

Signed and sealed this 17th day of September 1974.

(SEAL)
Attest:

McCOY M. GIBSON JR.
Attesting Officer

C. MARSHALL DANN
Commissioner of Patents

C-16,091